United States Patent [19]

Plantan

[11] Patent Number: 5,671,654

[45] Date of Patent: Sep. 30, 1997

[54] SEALED SPRING BRAKE ACTUATOR

[75] Inventor: Ronald S. Plantan, Charlotte, N.C.

[73] Assignee: Indian Head Industries, Charlotte, N.C.

[21] Appl. No.: 567,598

[22] Filed: Dec. 5, 1995

[51] Int. Cl.⁶ .................................................. F01B 7/00
[52] U.S. Cl. .......................... 92/63; 92/82; 285/179
[58] Field of Search .................. 92/63, 82; 91/436, 91/437, 442; 285/179, 180, 181

[56] References Cited

U.S. PATENT DOCUMENTS

| | | |
|---|---|---|
| 1,605,507 | 11/1926 | Burke ............................ 285/181 |
| 3,202,530 | 8/1965 | Dobrikin et al. ................ 92/63 |
| 3,401,606 | 9/1968 | Mathews et al. . | |
| 3,502,003 | 3/1970 | Dobrikin et al. . | |
| 3,943,831 | 3/1976 | Coupland . | |
| 4,221,158 | 9/1980 | Klimek et al. . | |
| 4,478,319 | 10/1984 | Casaline et al. . | |
| 4,890,540 | 1/1990 | Mullins . | |
| 4,907,496 | 3/1990 | Neal . | |

FOREIGN PATENT DOCUMENTS

| | | | |
|---|---|---|---|
| 2707957 | 8/1978 | Germany ............................ 92/63 |
| 3241547 | 5/1984 | Germany ............................ 92/63 |

Primary Examiner—Thomas E. Denion
Attorney, Agent, or Firm—Howard & Howard

[57] ABSTRACT

An improved brake actuator is fully sealed against ingress of liquid or other contaminants. Separate breather tubes selectively communicate each of the pressure ports to the non-pressurized sides of the service and spring chambers. The separate breather tubes provide clean air into the non-pressurized chambers. Relief valves are positioned in each of the breather tubes. The pressurized ports may be reconfigured into two configurations such that the source of pressurized air may be connected to either of two orientations. In addition, a seal closely receives the push rod such that the non-pressurized chamber of the service side is fully sealed against ingress of liquids.

15 Claims, 4 Drawing Sheets

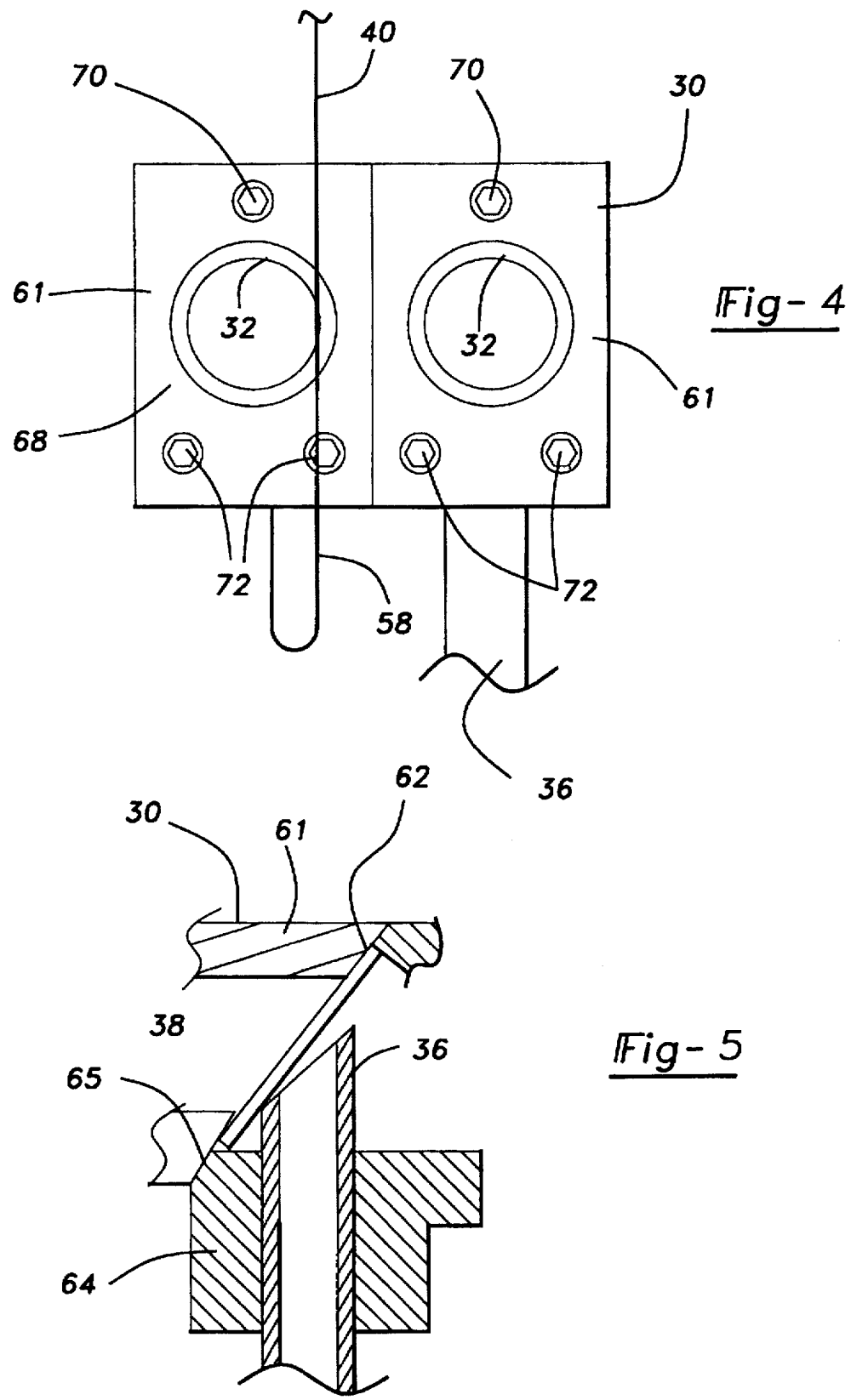

SEALED SPRING BRAKE ACTUATOR

BACKGROUND OF THE INVENTION

This invention relates to a spring brake actuator that is sealed against ingress of fluids or contaminants into the brake operating chambers.

In the prior art, attempts have been made to seal brake actuator chambers against leakage of fluid. In dual chamber brake actuators, a first chamber houses a powerful spring and selectively actuates a piston or diaphragm member to set the brake. A second chamber is provided with a diaphragm that is selectively actuated by pressurized air to also set the brake. The diaphragms or piston are defined as actuation members for purposes of this application. One side of each actuation member is selectively communicated with a source of pressurized air, and the other side is constantly at atmospheric pressure. As the actuation members reciprocate within their respective chambers, the amount of air in the chambers on the opposed sides of the actuation members varies. In most prior art brake actuators, the side of the brake actuator which is exposed to atmospheric pressure merely dumps to atmosphere when it contracts, and receives additional air from the atmosphere when it expands. This is a simple means of controlling the pressure in the nonpressurized chambers. However, opening the chamber to atmospheric air also allows the ingress of contaminants such as water, etc. into the chambers.

Solutions to seal the non-pressurized chambers have been proposed. In one widely utilized type of sealing structure, a so-called "breather tube" connects the non-pressurized chambers of the spring and service chambers. Typically, the breather tube allows the air in the non-pressurized chamber of the spring chamber to be provided by air in the non-pressurized chamber of the service chamber. There are still some complications in providing sufficient clean air during the operation of the system.

In another proposed system, a valve is provided on the spring side of the brake actuator and allows flow of pressurized air into the spring chamber during one mode of operation. When the spring chamber pressurized side begins to contract, that same air moves around the valve and into the non-pressurized side of the spring chamber. While this arrangement does provide benefits, it has only been utilized on one chamber of the brake actuators. Moreover, the proposed valving structure may sometimes constrict the flow.

In prior art brake actuators it has been a goal to allow the attachment of the pressurized air source in a variety of orientations. In some vehicle applications it may be desirable for the pressurized air to be attached to the brake actuator in an orientation extending parallel to the central axis of the brake actuator. Alternatively, in other applications it may be desirable to attach this pressurized air source extending perpendicular to the central axis of the brake actuator. The prior art brake actuators have not easily allowed such modification.

Another problem in the prior art involves sealing the push rod that typically leaves the service chamber, and is the portion that actuates the brake. The push rod must move freely within the service chamber, and typically there has been a space between the push rod and a member for preventing ingress of stones or other items into the chamber. These store shields do not provide a fluid seal. Sealing boots have been proposed which are attached to the push rod and move with the push rod. These sealing boots are somewhat impractical, as it is difficult to develop a moveable member which also is able to survive the harsh environment of a brake actuator.

SUMMARY OF THE INVENTION

In a disclosed embodiment of this invention, separate breather tubes are provided for both the spring and service chambers. Each breather tube is preferably associated with the pressurized air port for the respective chamber. In one preferred embodiment, that tube extends upwardly into a chamber communicating with the pressurized air port, and includes an angled end which provides a valve seat for a flexible valve member. When pressurized air is communicated to the pressurized air port, the flexible valve is biased against the tube end, sealing the breather tube.

On the other hand, when no pressurized air is being delivered to the respective chamber, and air is instead being driven out of the pressurized side of that chamber, the air drives the flexible valve towards the pressurized air port. Air may then escape into the breather tube and to the non-pressurized chamber. The air delivered to the non-pressurized chamber is thus clean. A pressure relief valve is provided in the breather tube. Any excess air pressure delivered to the non-pressurized chamber exits through the pressure relief valve.

In another aspect of this invention, the pressurized air port is removable from the brake actuator structure. In a preferred embodiment the port is provided with the ability to be rotated such that the orientation of the connection for the pressurized air source may be varied. In one most preferred embodiment, the pressurized air port is provided by a valve block including two housing portions each having angled faces. By changing the orientation of the two housing portions, the connection for the pressurized air may be at 90° relative to the central axis of the brake actuator, or may be parallel to the central axis of the brake actuator chamber. With this feature of the invention, there is greater flexibility in the ability to connect the pressurized air source at any desired orientation.

In another feature of the present invention, a seal is provided on the push rod. The seal preferably also has a portion that seals against a bracket for mounting the brake actuator to the vehicle. The one-piece seal preferably has a first sealing portion outside of the service chamber that seals the bracket, and a lip portion received within the opening in the service chamber through which the push rod extends. A frustro-conical portion of the seal extends upwardly and seals closely on the push rod.

With the inventive spring brake actuator, the chambers are both sealed against ingress of liquids or other contaminants.

These and other features of the present invention can be best understood from the following specification and drawings, of which the following is a brief description.

BRIEF DESCRIPTION OF THE DRAWINGS

FIG. 4 is a partial side view showing features of the present invention.

FIG. 5 shows a modification of the brake actuator of the present invention.

DETAILED DESCRIPTION OF PREFERRED EMBODIMENTS

Figure 1A:
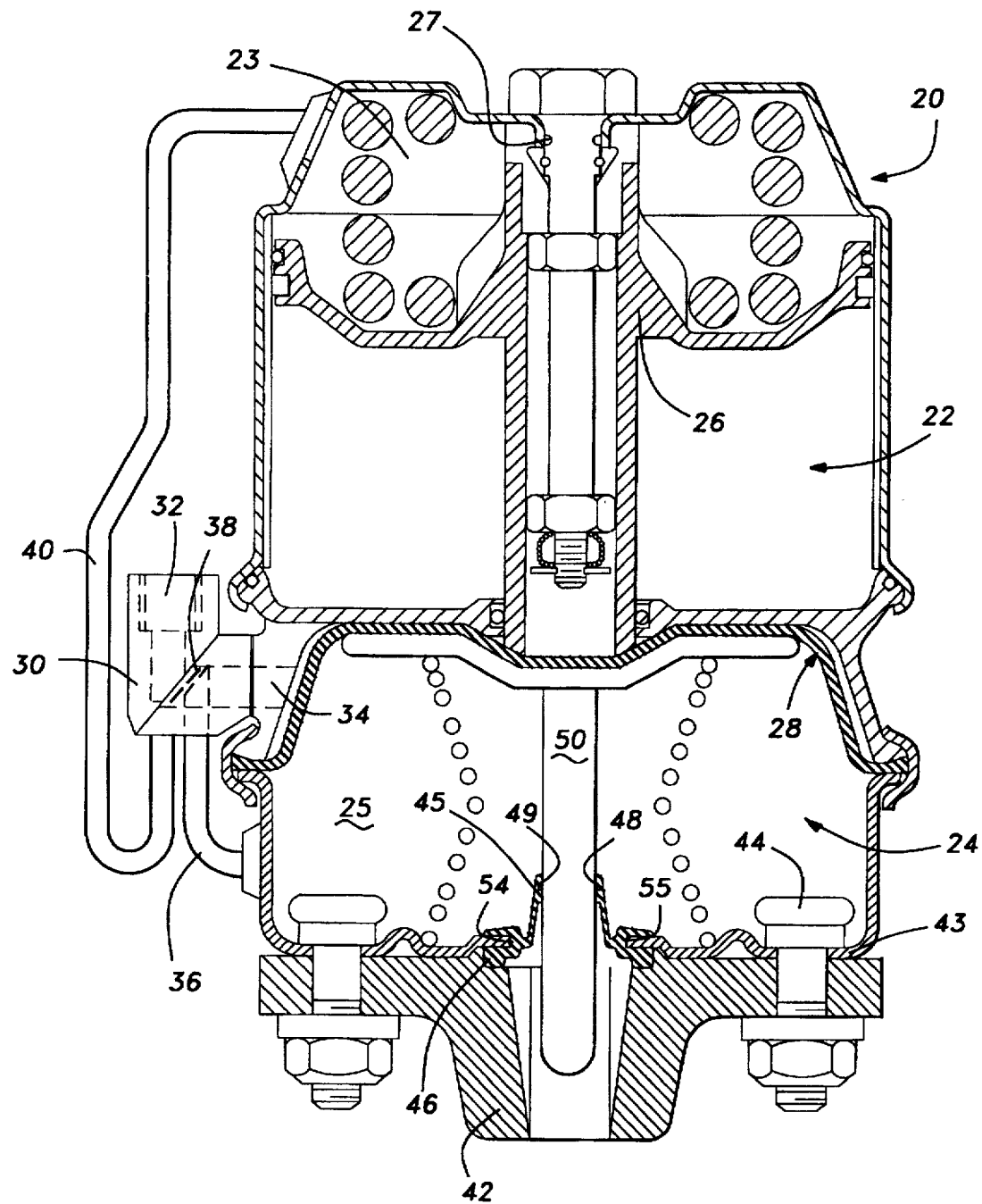
FIG. 1A is a cross-sectional view through a brake actuator incorporating the present invention.

FIG. 1A shows a brake actuator structure 20 incorporating a spring chamber 22 and a service chamber 24. As is known, non-pressurized chambers 23 and 25 are defined in the chambers 22 and 24. A piston 26 divides the spring chamber 22 into the pressurized and non-pressurized chambers. A diaphragm 28 does the same on the service chamber 24.

The present invention relates to a method of sealing the non-pressurized chambers against the ingress of fluid or other contaminants. To this end, a pressurize port 30 includes a threaded opening 32 to receive a connection to a source of pressurized air. Opening 32 leads to an opening 34 passing into the pressurized chamber in the service chamber 24. A breather tube 36 selectively connects the line leading from the opening 34 to the non-pressurized chamber 25 of the service chamber 24. A valve 38 controls the flow of air between the pressurized port 32 and the opening 34, and also into the breather tube 36 in a manner which will be described below. A similar breather tube 40 is provided which controls the flow of air to the non-pressurized chamber 23 of the spring chamber 22.

In addition, a bracket 42 may mount the brake actuator to a brake structure on a vehicle. Bolts 44 secure the bracket 42 to the brake actuator service chamber housing 43. A seal 45 includes a cylindrical seal portion 46 which seals the connection between the bracket 42 and the service chamber housing 43. A frustro-conical portion 48 extends upwardly to an opening 49 and seals a push rod 50, which moves inwardly and outwardly of the service chamber. The seal 45 further includes a cylindrical lip 54 which is received in the opening 55 in the service chamber housing to secure the seal 45 to the brake actuator. The seal is sufficiently rigid that it will maintain its shape as the push rod 50 moves inwardly and outwardly of the frustro-conical portion 48. An o-ring seal 27 seals the release bolt. Thus, all chamber of actuator 20 are fully sealed.

Figure 1B:
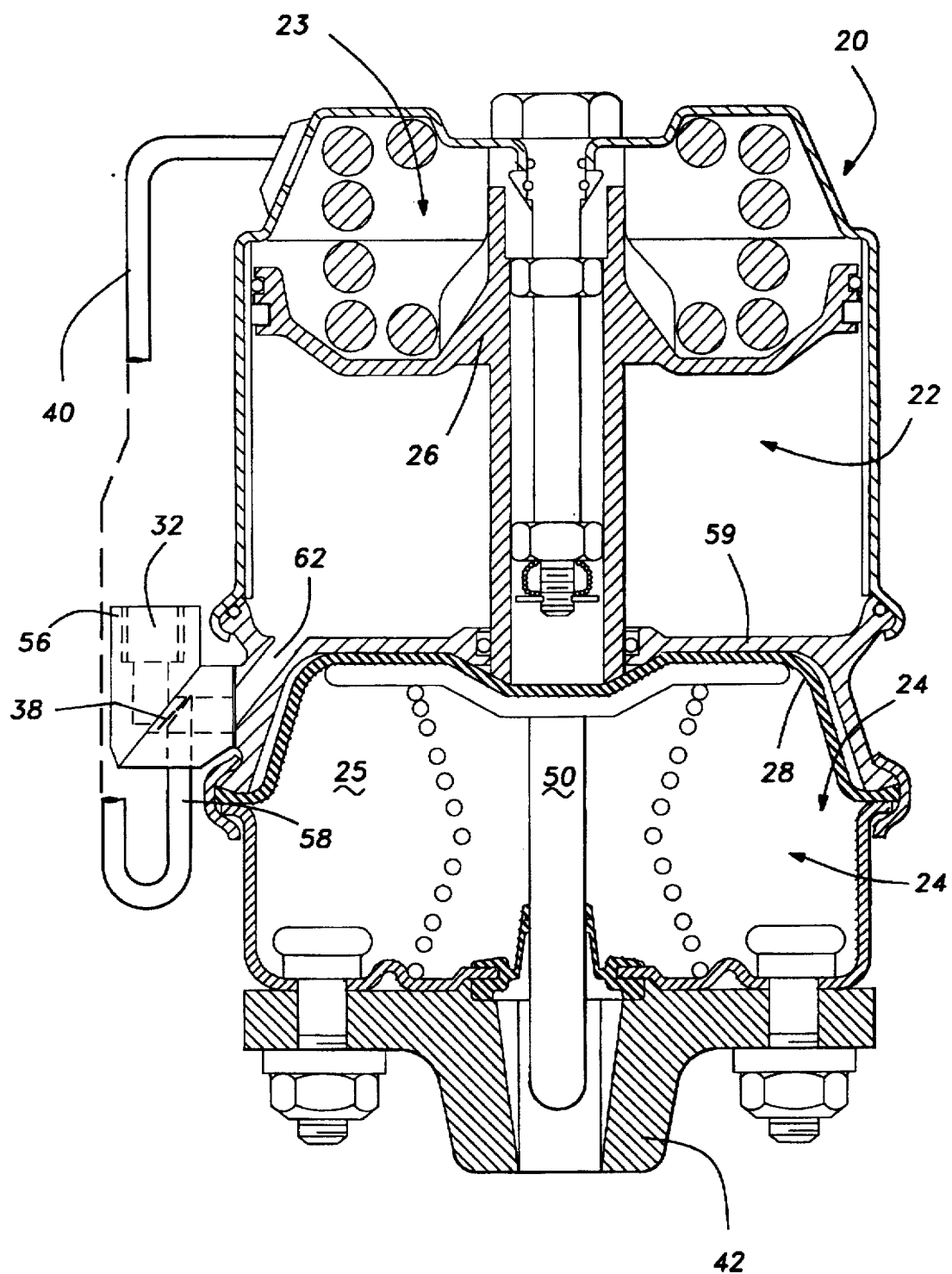
FIG. 1B is a cross-sectional view through another portion of the brake actuator of the present invention.

FIG. 1B shows the pressurized air port 56 leading to the spring chamber 22. A breather tube portion 58 extends upwardly into the pressurized air port and communicates with the breather tube portion 40 leading to the non-pressurized chamber 23. The opening 62 extending through the central housing 59, communicates pressurized air from the threaded port 56 into the pressurized side of the spring chamber 22.

Figure 2:
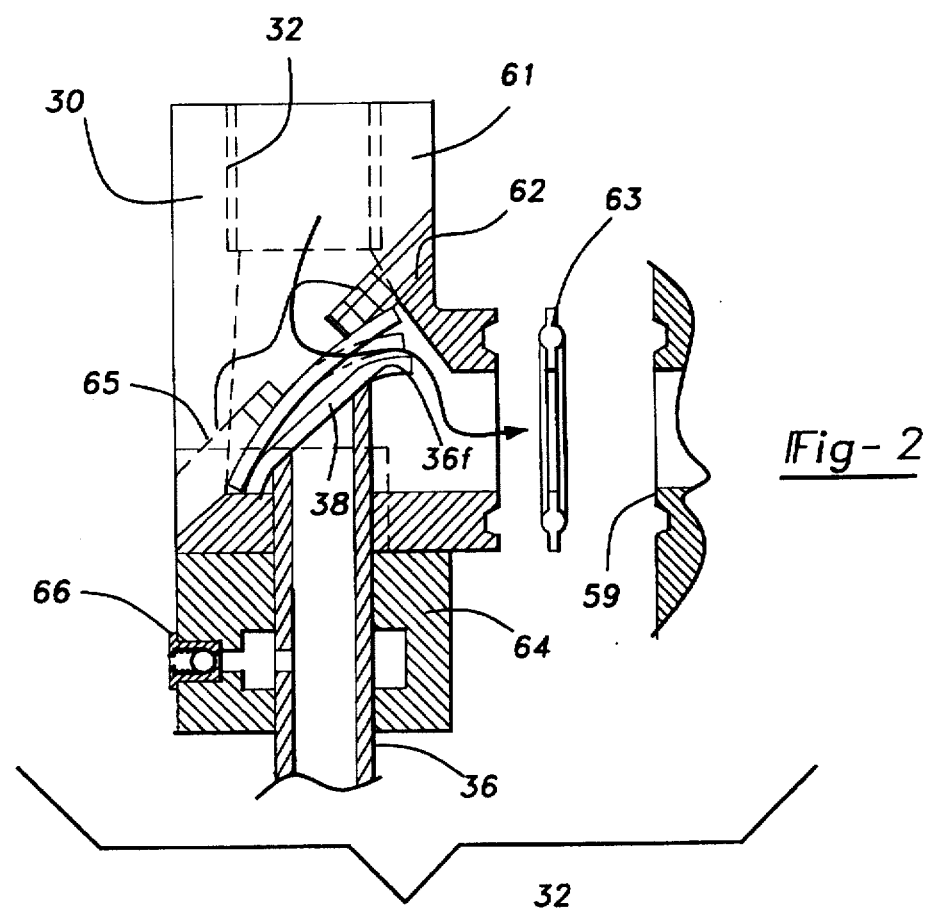
FIG. 2 is a detail of the spring brake actuator of the present invention.
Figure 3:
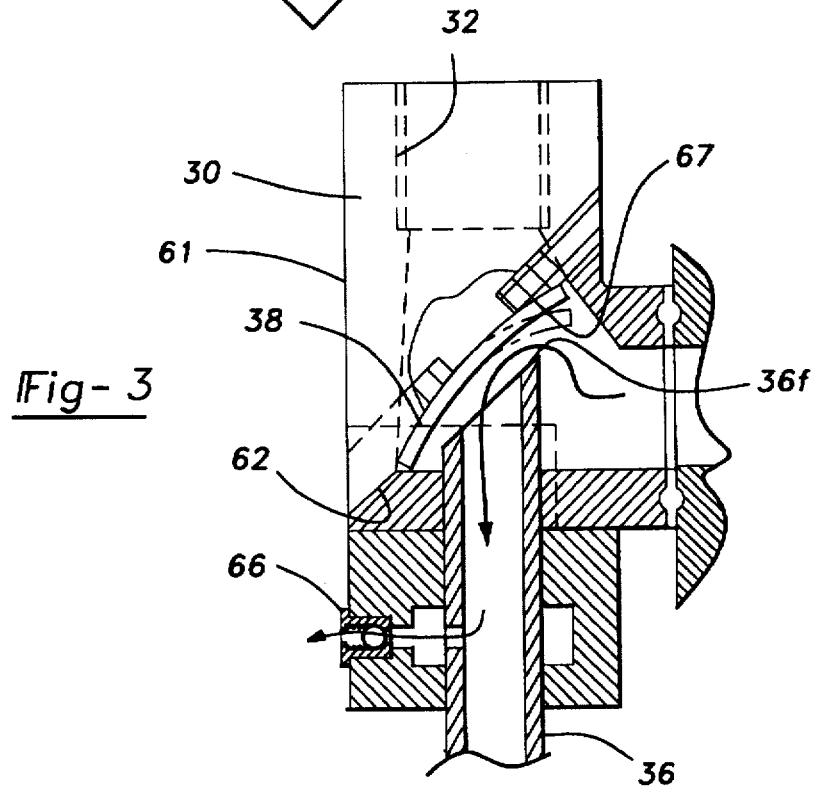
FIG. 3 shows the FIG. 2 structure in another mode of operation.

FIGS. 2 and 3 show the operation of one air pressure port and breather tube, although it should be understood that both the spring and service chamber ports and breather tubes operate in a similar fashion.

As shown in FIG. 2, the port 30 includes the threaded opening 32 to receive the source of pressurized air. The breather tube 36 extends upwardly into a chamber to an angled top end 361. The valve 38 is shown sealing end 36f as pressurized air is moving through port 32 and into the service chamber. Thus, the flow of pressurized air into the service chamber in unimpeded, and no air is directed into the breather tube 36. Note also, gasket 63 for sealing the connection between the port 30 and the housing 59.

In other features of this invention, the port 30 is formed of two housing parts, with a first housing part 61 having an angled face 62. A second housing part 64 has a mating angled face 65. In the illustrated orientation, the housing parts 61 and 64 provide for the flow of air into the port 32 from a source of air extending parallel to the central axis of the brake actuator. As mentioned above, in various applications, it may be desirable to have the freedom to change this orientation, and the present invention allows such change as will be described in more detail below. In addition, a relief valve 66 communicates with the breather tube 36. In the mode of operation illustrated in FIG. 2, the relief valve 66 is non-functioning as no air is being directed into the breather tube 36.

As shown in FIG. 3, air is now exiting the pressurized side of the service chamber. That air biases the valve 38 back upwardly against a seat 67 on the face 62 of the housing portion 61. Thus, the air exiting the service chamber is not directed into the port 32, but rather exits through the breather tube 36 and to chamber 25.

When air is leaving the service chamber pressurized side, typically the diaphragm would be moving upwardly in the orientation of FIGS. 1A and 1B. The non-pressurized chamber 25 is expanding, and the air leading through breather tube 36 moves into that chamber 25. At the same time, should too much air be directed towards the non-pressurized chamber 25, the air exits through the relief valve 66. The relief valve 66 is set to preferably maintain a pressure in the non-pressurized chamber that approximates atmospheric pressure. The valve on the spring chamber operates in a similar fashion. Due to this inventive arrangement, air is not directed back towards the source, and the air which is directed into the non-pressurized chambers is fully sealed and clean air. In combination with the seal 45, the present invention ensures that the brake actuator will be fully sealed against ingress of liquid contaminants.

FIG. 4 is a schematic end view of the ports 30 and 68 for providing the connection to the pressurized air source to the service and spring chambers, respectively. As shown, the parts may be provided by separate blocks, although a single body may also be used. The spring chamber side is somewhat simplified in FIG. 4 in that the breather tube portion 40 actually extends downwardly from the body 68 and then back upwardly. For purposes of simplifying this illustration for understanding, the breather tube 40 is illustrated as a line on the spring chamber port side. Bolts 70 secure the two housing portions 61 and 64 together at the desired orientation. Bolts 72 secure the ports 30 and 61 to the central housing 59.

As shown in FIG. 5, the housing members 61 and 64 may be moved about their mating surfaces 62 and 65 such that the orientation of the port 32 may be changed relative to the central axis of the brake actuator. As described above, the spring chamber port has the identical ability. With the two housing portions moved to this new orientation, the connection 32 for attachment of a pressurized source of air now extends perpendicular to the central axis of the brake actuator. This is the orientation shown in FIG. 4. As described above, this provides valuable benefits.

A preferred embodiment of this invention has been disclosed, however, a worker of ordinary skill in the art would recognize that certain modifications would come within the scope of this invention. For that reason the following claims should be studied to determine the true scope and content of this invention.

I claim:

1. A spring brake actuator comprising:
   a central housing defining a spring chamber on one side and a service chamber on an opposed side;
   a spring chamber housing attached to said central housing to define said spring chamber and a service chamber housing attached to said central housing on an opposed side to define said service chamber;
   actuation members received in both said spring and service chambers;
   pressurized air ports for selectively providing pressurized air to one side of said actuation members in both said spring and service chambers, an opposed side of each said actuation member being maintained at a lower pressure;

a breather tube selectively connecting said pressurized side of said service chamber to said lower pressure side of said service chamber, and a separate breather tube selectively connecting said pressurized side of said spring chamber to said lower pressure side of said spring chamber;

said breather tubes each extending into an associated valve chamber communicating with a source of pressurized air, each said breather tubes having an end angled at 45° relative to a central axis of said breather tube and received within said valve chamber, a flexible valve received within each said valve chambers, said flexible valve sealing said end of said breather tube when pressurized air is directed through an associated one of said ports and said valve allowing flow of air from said valve chamber into said breather tube when said pressurized air is not being directed into said associated port, said valve chambers each formed of two parts having a fluid passage centered on a part axis, said two parts having mating surfaces angled at 45° relative to said port axis, parallel to said end of said breather tube.

2. A spring brake actuator as recited in claim 1, wherein a pressure relief valve is provided in each of said separate breather tubes.

3. A spring brake actuator as recited in claim 1, wherein a seal is positioned in said service chamber housing, a push rod reciprocating through said seal and outwardly of said service chamber housing to actuate a brake, said seal including a frustro-conical portion extending from said service chamber housing to closely surround said push rod.

4. A spring brake actuator as recited in claim 3, wherein said seal further includes a cylindrical seal portion which seals against a bracket member for securing said brake actuator to a vehicle.

5. A spring brake actuator comprising:

a central housing defining a spring chamber on one side and a service chamber on an opposed side;

a service chamber housing connected to said central housing and a spring chamber housing connected to an opposed face of said central housing;

actuation members received within each of said service and said spring chambers, said actuation members dividing said chambers into pressurized portions on one side and non-pressurized portions on another side, at least one breather tube for delivering clean air into said non-pressurized chambers on both said service and said spring chambers;

a push rod exiting said service chamber housing for actuation of a brake actuator, a seal for sealing against said push rod, but for allowing relatively movement of said push rod into and out of said service chamber housing; and said seal being secured within an opening in said service chamber and having a frustro-conical portion extending further into said service chamber to seal against said push rod, said push rod being movable relative to said seal, said frustro-conical portion maintaining its shape as said push rod moves through said seal.

6. A spring brake actuator as recited in claim 5, wherein said seal further has a cylindrical portion for being sealed against a bracket member which secures said brake actuator to a vehicle body.

7. A spring brake actuator as recited in claim 6, wherein a cylindrical seat secures said seal within said opening in said service chamber housing.

8. A spring brake actuator as recited in claim 5, wherein there are separate breather tubes communicating to each of said non-pressurized chambers.

9. A spring brake actuator comprising:

a central housing defining a spring chamber on one side and a service chamber on an opposed side;

a spring chamber housing attached to said central housing to define said spring chamber and a service chamber housing attached to said central housing on an opposed side to define said service chamber;

actuation members received in both said spring and service chambers;

pressurized air ports for selectively providing pressurized air to one side of said actuators in both said spring and service chambers, said ports being recombinable into two configurations to change the relative orientation of said port and a central axis of said brake actuator;

separate breather tubes selectively connecting a pressurized side of said service chamber to a non-pressurized side of said service chamber, and a separate breather tube selectively connecting a pressurized side of said spring chamber to a non-pressurized side of said spring chamber;

a push rod reciprocating outwardly of an opening in said service chamber housing, a seal received within said opening and sealing said push rod;

said seal being secured within an opening in said service chamber and having a frustro-conical portion extending further into said service chamber to seal against said push rod, said push rod being movable relative to said seal, said frustro-conical portion maintaining its shape as said push rod moves through said seal.

10. A spring brake actuator as recited in claim 9, wherein said ports include two parts each having mating angled faces, with one of said two parts including a threaded portion for connection to a source of pressurized air, and the other of said two parts communicating with said chamber, said two parts being selectively connected to each other in either of two orientations to provide two possible orientations of said port relative to said central axis of said brake actuator.

11. A spring brake actuator as recited in claim 9, wherein said breather tubes each extend into a valve chamber communicating with a source of pressurized air, said breather tubes having an angled end received within said valve chamber, a flexible valve received within said valve chamber, said flexible valve sealing said end of said breather tube when pressurized air is directed to said port, and said valve allowing flow of air from said pressurized chamber into said breather tube when pressurized air is not being directed into said port.

12. A spring brake actuator as recited in claim 11, wherein said ports for said service and said spring chambers are each formed of two parts, said two parts having mating angled surfaces, such that the orientation of said two parts may be changed between two orientations to change the relative orientation of a source of pressurized air in a central axis of said spring brake actuator.

13. A spring brake actuator as recited in claim 9, wherein said seal includes a frustro-conical portion extending from said service chamber housing to seal push rod, but allow relative movement.

14. A spring brake actuator as recited in claim 13, wherein said seal further includes a cylindrical seal portion with the seals against a bracket for securing said brake actuator to a vehicle.

15. A spring brake actuator comprising:

a central housing defining a spring chamber on one side of said central housing and a service chamber on an opposed side of said central housing;

a spring chamber housing secured to said central housing to further define said spring chamber, and a service chamber housing attached to said central housing to define said service chamber;

actuation members received within each of said spring and service chambers, said actuation members having a first face selectively communicated to a source of pressurized air, and an opposed face communicating with a lower air pressure;

ports for selectively communicating pressurized air to said chambers in each of said service and said spring chambers, said ports having a threaded portion for being connected to a source of pressurized air, and said ports being selectively positioned such that said threaded portion may extend generally parallel to a central axis of said brake actuator, or may extend perpendicular to said central axis; and said ports including two parts each having a central fluid passage extending along a part axis each of said parts having mating angled faces angled at 45° relative to said part axis, with one of said parts including said threaded portion and the other of said two parts being communicated with one of said chambers and removably connected to said central housing, said two parts being selectively connected to each other in either of two orientations to provide the two possible orientations of said connection relative to said central axis of said brake actuator.

* * * * *